United States Patent [19]
Tessier et al.

[11] Patent Number: 6,149,788
[45] Date of Patent: Nov. 21, 2000

[54] METHOD AND APPARATUS FOR PREVENTING SCALING IN ELECTRODEIONIZATION UNITS

[75] Inventors: David Florian Tessier, Guelph; Robert Glegg, Campbellville; John H. Barber, Fergus, all of Canada

[73] Assignee: E-Cell Corporation, Guelph, Canada

[21] Appl. No.: 09/174,248

[22] Filed: Oct. 16, 1998

[51] Int. Cl.$^7$ ................................................ B01D 61/48
[52] U.S. Cl. ........................ 204/524; 204/525; 204/533; 204/536; 204/632
[58] Field of Search .................................. 204/524, 525, 204/533, 536, 632

[56] References Cited

U.S. PATENT DOCUMENTS

| | | | |
|---|---|---|---|
| 4,925,541 | 5/1990 | Giuffrida et al. ........................ | 204/524 |
| 5,116,509 | 5/1992 | White ...................................... | 204/524 |

FOREIGN PATENT DOCUMENTS

| | | | |
|---|---|---|---|
| 839762 | 5/1998 | European Pat. Off. . | |
| 352047580 A | 4/1977 | Japan ..................................... | 204/525 |
| 9024374 | 1/1997 | Japan . | |
| WO 97/34696 | 9/1997 | WIPO . | |

OTHER PUBLICATIONS

Studies on polarity reversal with continuous deionization—Desalination, 86 (1992) by Yoram Oren and Yair Egozy (pp. 155–171).

Primary Examiner—Arun S. Phasge
Attorney, Agent, or Firm—Arne I. Fors

[57] ABSTRACT

A method and apparatus is provided for inhibiting scaling in an electrodeionization system and, more particularly, for increasing tolerance to hardness in the feed water to an electrodeionization unit by inhibiting precipitation of scale-forming metallic cations contained in the feed water and thereby increasing efficiencies of the electrodeionization system. Water to be purified is passed through an electrodeionization unit in which the flow in the diluting compartment is countercurrent to the flow in the concentrating compartment. This is to impede the migration of scale-forming metallic cations from the diluting compartment, through the cation exchange membrane, into the concentrating compartment and towards the concentrating compartment side of the anion exchange membrane, thereby preventing scale formation on the anion exchange membrane. The electrodeionization unit may be further modified by dividing the concentrating compartments into first and second compartments by a porous diaphragm or ion-conducting membrane. The porous diaphragm or ion-conducting membrane effectively eliminates convective transport of scale-forming metallic cations from the cation exchange membrane side of the concentrating compartment to the anion exchange membrane side of the concentrating compartment, thereby inhibiting scale formation on the anion exchange membrane.

28 Claims, 6 Drawing Sheets

METHOD AND APPARATUS FOR PREVENTING SCALING IN ELECTRODEIONIZATION UNITS

FIELD OF THE INVENTION

The present invention relates to a method and apparatus for inhibiting scaling in an electrodeionization system or in a combined reverse osmosis/electrodeionization system for water treatment and, more particularly, for manipulating the flow conditions within the electrodeionization system to inhibit precipitation of scale-forming metallic cations and consequent scaling of concentrate-chamber side of associated anion exchange membranes.

DESCRIPTION OF THE RELATED ART

The purification of liquid has become of great interest in many industries. In particular, pure water is used for many industrial purposes such as, in processes for producing semiconductor chips, in power plants, in the petrochemical industry and for many other purposes.

Ion exchange resins, reverse osmosis filtration and electrodialysis techniques have been used to reduce the concentration of ions in a liquid.

Electrodeionization apparatus have recently been used with more frequency to reduce the concentration of ions in a liquid. The term "electrodeionization" generally refers to an apparatus and a process for purifying liquids which combine ion exchange resins, ion exchange membranes and electricity to purify the liquids. An electrodeionization module comprises alternating arrangements of cation permeable membranes and anion permeable membranes defining compartments therebetween. In alternating compartments, there is provided ion exchange resin beads. Those compartments are known as diluting compartments. The compartments which generally do not contain ion exchange resin are known as the concentrating compartments. Ions migrate from the diluting compartments through ion exchange beads and ion permeable membranes into the concentrating compartments by the introduction of current. The liquid flowing through the concentrating compartments is discarded or partially recycled and the purified liquid flowing through the diluting compartments is recovered as demineralized liquid product.

Scaling of electrodeionization equipment is of particular concern as it reduces membrane efficiencies and fouls electrode surfaces. Scaling has been found to occur in localized regions of electrodeionization equipment, and particularly those where high pH is typically present. Such regions include those on the surface of the concentrate-chamber side of anion exchange membranes, due to the flux of hydroxyl ions resulting from the regenerative water splitting process in the diluting chambers. Localized regions of high pH are also typically present on the cathode surface due to the evolution of hydrogen gas and concomitant production of hydroxyl ion according to the cathodic electrode reaction:

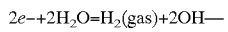

$$2e^- + 2H_2O = H_2(gas) + 2OH^-$$

These localized regions of high pH provide conditions under which scales harmful to the performance of the electrodeionization device can form. Generally, these scales form in the presence of polyvalent metal cations such as $Ca^{2+}$, $Mg^{2+}$, $Sr^{2+}$, $Ba^{2+}$, $Fe^{3+}$, $Al^{3+}$ and the like which can precipitate under local high pH conditions as hydroxides, oxides, sulphates and phosphates when these anions are present, carbonates when carbonate, bicarbonate or carbon dioxide is present, mixed oxides such as spinels, mixed carbonates, and fluorides when fluoride ions are present. Due to the low solubility products of these compounds, and to the high local pH, even trace amounts of these metal cations and counter anions in the concentrate streams will be sufficient to cause undesirable precipitation.

Prior art methods for preventing scale formation typically focus on removing polyvalent cations from the supply stream to the concentrate chamber by adding water softeners. This necessarily requires the addition of chemicals to the system, which potentially compromises the quality of associated effluent streams, thereby raising environmental concerns.

Another prior art method, disclosed in European Patent Application Ser. No. 97118847.9 teaches acid injection to the concentrate chamber supply stream to neutralize the basic conditions particularly arising at the concentrate chamber side of associated anion exchange members. To be effective, this method requires the addition of significant amounts of acid, sometimes generated on-site with additional ancillary equipment. Such features render this method relatively expensive.

SUMMARY OF THE INVENTION

In its broad aspect, the present invention provides a method for inhibiting formation of scale in an electrodeionization unit for deionizing water having an anode compartment at one end of the unit, a cathode compartment at the opposite end of the unit, and a plurality of diluting compartments alternating with concentrating compartments positioned between the anode and cathode compartments, which comprises passing feed water to be deionized through the diluting compartments, passing water or an aqueous solution for accepting ions from the feed water through at least one of the concentrating compartments in a direction opposite to that of the feed water, passing water in an aqueous solution through the anode and cathode compartments, and applying an electrical voltage between the anode and the cathode whereby ions in the feed water migrate to the water or aqueous solution in the concentrating compartments. Prior to introduction to the concentrating compartment, the water or aqueous solution may be treated for removal of scale-forming metallic cations by a suitable unit operation, such as reverse osmosis or water softening. Alternatively, a bleed of purified water from the discharge of the diluting compartments in the electrodeionization unit can supply water to the concentrating compartment. Salt can be injected into the water or aqueous solution being supplied to the concentrating compartment for increasing electrical conductivity within the concentrating compartment.

In another aspect, the present invention provides an electrodeionization unit for deionizing water having an anode compartment at one end of the unit, a cathode compartment at the opposite end of the unit, and a plurality of diluting compartments alternating with concentrating compartments between the said anode and cathode compartments, each of diluting and concentrating compartments defined by anion and cation exchange membranes, each of said concentrating compartments further comprising a porous diaphragm or ion-conducting membrane for dividing said concentrating compartment into first and second compartments such that the first compartment is defined by an anion exchange membrane and the porous diaphragm or ion-conducting membrane and the second compartment is defined by the cation exchange membrane and the porous diaphragm or ion-conducting membrane wherein liquid in the first compartment is prevented from mixing with liquid in the second compartment and wherein ions can migrate under the influence of the applied electric field between the first and second compartments through the porous diaphragm or ion-conducting membrane.

In yet a further aspect, the present invention provides a method for inhibiting scale formation in an electrodeionization unit for deionizing water having an anode compartment at one end of the unit, a cathode compartment at the opposite end of the unit, and a plurality of diluting compartments alternating with concentrating compartments positioned between the anode and cathode compartments, each of the concentrating compartments further comprising a porous diaphragm or ion-conducting membrane for dividing the concentrating compartment into first and second compartments such that the first compartment is defined by an anion exchange membrane and the porous diaphragm or ion-conducting membrane and the second compartment is defined by the cation exchange membrane and porous diaphragm or ion-conducting membrane wherein liquid in said first compartment is prevented from mixing with liquid in the second compartment and wherein ions can migrate between the first and second compartments through the porous diaphragm or ion-conducting membrane, such method comprising passing feed water to be deionized through the diluting compartments, passing water or an aqueous solution for accepting ions from the feed water through the concentrating compartments in a direction opposite to that of the feed water, passing water in an aqueous solution through the anode and cathode compartments, applying an electrical voltage between the anode and the cathode whereby ions in the feed water migrate to the water or aqueous solution in the concentrating compartments. Prior to introduction to the concentrating compartment, the water or aqueous solution can be treated for removal of metallic cations by a suitable unit operation, such as reverse osmosis or water softening. Alternatively, the water being passed through the concentrating compartment can be supplied from a bleed of purified water from the discharge of the diluting compartments in the electrodeionization unit. Salt can be injected into the water or aqueous solution being supplied to the concentrating compartment for increasing electrical conductivity within the concentrating compartment.

BRIEF DESCRIPTION OF THE DRAWINGS

The method and apparatus of the invention will now be described with reference to the accompanying drawings, in which.

DESCRIPTION OF THE PREFERRED EMBODIMENT

The processes of the present invention will be described with reference to the accompanying drawings. In general, the invention is applicable to water purification processes which are carried out using an electrodeionization unit or with an electrodeionization unit and reverse osmosis unit in series.

Figure 1:
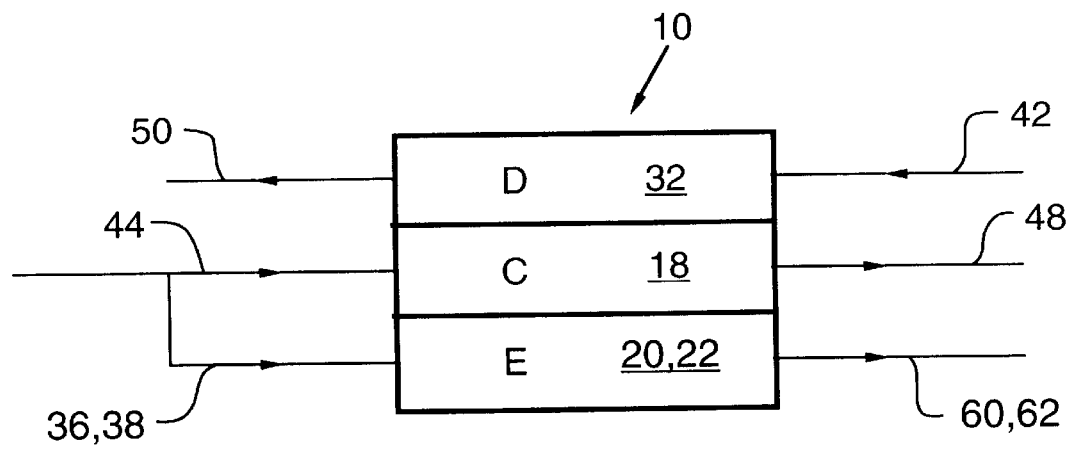
FIG. 1 is a schematic flowsheet of a first embodiment of the present invention.
Figure 5:
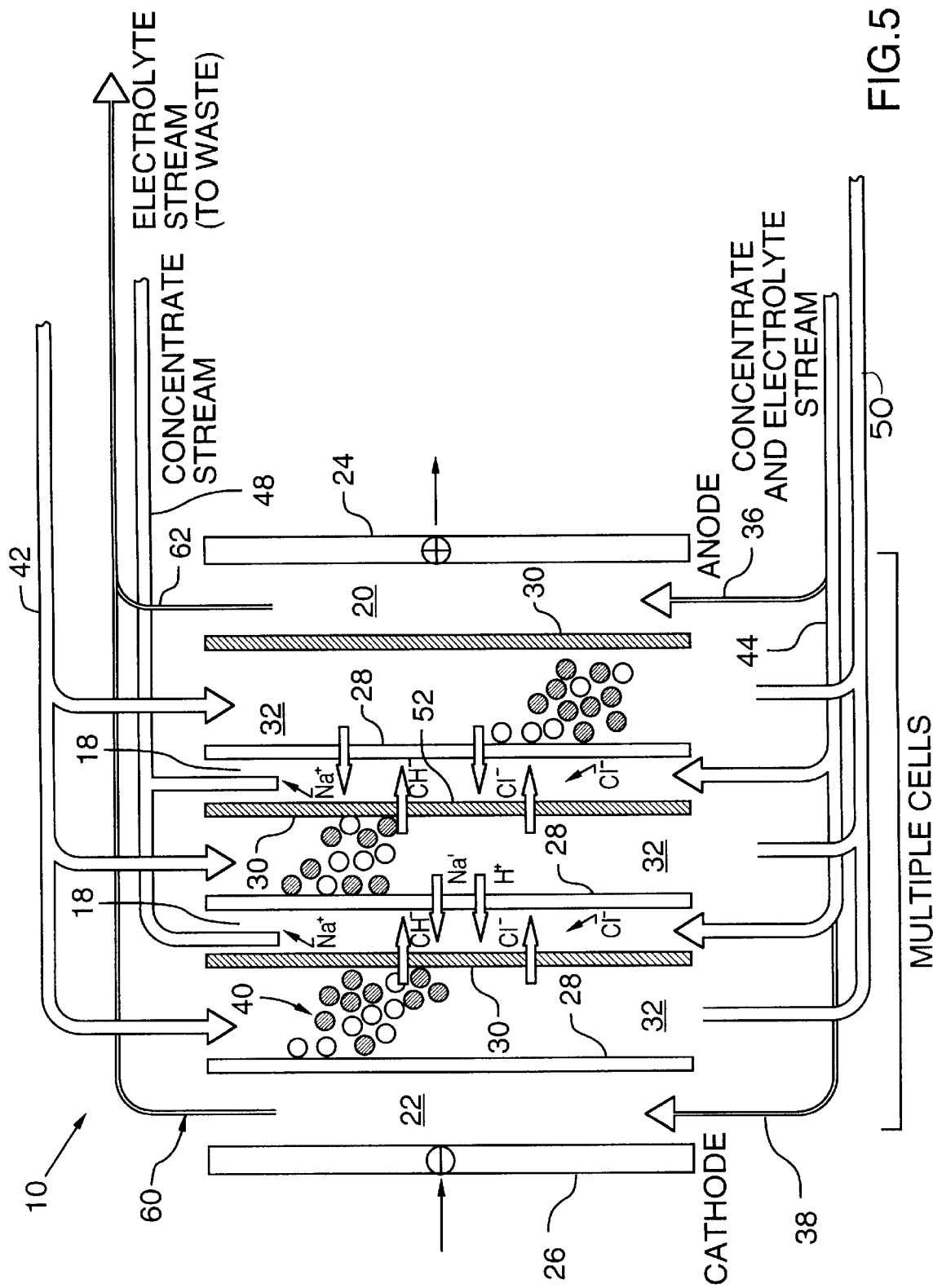
FIG. 5 is a detailed schematic drawing of an electrodeionization unit of any of the FIGS. 1, 2, 3 and 4.

Referring first to FIGS. 1 and 5, the electrodeionization unit 10 in accordance with the present invention comprises the anode compartment 20 provided with an anode 24 and the cathode compartment 22 provided with a cathode 26. A plurality of cation exchange membranes 28 and anion exchange membranes 30 are alternately arranged between the anode compartment 20 and the cathode compartment 22 to form diluting compartments 32 each defined by anion exchange membrane 30 on the anode side and by a cation exchange membrane 28 on the cathode side and concentrating compartments 18 each defined by a cation exchange membrane 28 on the anode side and by an anion exchange membrane 30 on the cathode side. Electrolyte solution is supplied to anode compartment 20 and to cathode compartment 22 via flowstreams 36 and 38 respectively with respective discharges 60 and 62.

Ion exchange material such as ion exchange resin beads designated by numeral 40 preferably are provided in diluting compartments 32. These may comprise either anion or cation exchange resins or a mixture thereof, mixed bed, layers, continuous/discontinuous phases, and the like, such as disclosed in PCT Application Ser. No. PCT/CA97/00018, incorporated herein by reference. Such media enhance water purification by removing unwanted ions by ion exchange. Further, such media facilitate migration of ions towards membranes 28 and 30 for subsequent permeation therethrough, as will be described herein below.

Water to be treated is introduced into the diluting compartments 32 from supply stream 42. Similarly, water or an aqueous solution is introduced into the concentrating compartments 18 from a supply stream 44. Stream 44 can also supply flowstreams 36 and 38 for supplying water or aqueous solution to anode compartment 20 and cathode compartment 22 respectively. A predetermined electrical voltage is applied between the two electrodes whereby anions in diluting compartments 32 permeate through anion exchange membranes 30 and into concentrating compartments 18 while cations in streams in diluting compartments 32 permeate through cation exchange membranes 28 and into concentrating compartments 18. The above-described migration of anions and cations is further facilitated by the ion exchange material 40 present in diluting compartments 32. In this respect, driven by the applied voltage, cations in diluting compartments 32 migrate through cation exchange resins using ion exchange mechanisms, and eventually pass through cation exchange membranes 28 which are in direct contact with the cation exchange resins. Similarly, anions in diluting compartments 32 migrate through anion exchange resins using ion exchange mechanisms, and eventually pass through anion exchange membranes 30 which are in direct contact with the anion exchange resins. Aqueous solution or water introduced into concentrating compartments 18 from stream 44, and anion and cation species which subsequently migrate into these compartments, are collected and removed as a concentrated solution from discharge stream 48, while a purified water stream is discharged from diluting compartments 32 as discharge stream 50.

By virtue of the current flowing between the cathode 26 in the cathode compartment 22 and the anode 24 in the anode compartment 20, water is ionized into hydrogen and hydroxyl ions. Hydroxyl ions migrate through the anion exchange membrane 30 and become locally concentrated on the surface 52 of the concentrate compartment side of the anion exchange membrane 30. This creates a localized region of high pH near this surface 52 of the anion exchange membrane 30, thereby promoting the formation of scale.

To prevent the formation of scale on the surfaces 52 of the anion exchange membrane 30, the water or aqueous solution in the concentrating compartment 18 flows in the opposite direction, or in counterflow manner, relative to the water being purified in diluting compartment 32. The thermodynamic tendency of scale-forming metallic cations, such as $Mg^{2+}$, to be removed from the water being treated in diluting compartment 32 and adsorbed on ion exchange material 40 is greater than for other passive cations, such as $Na^+$. As a result, scale-forming metallic cations such as $Mg^{2+}$ tend to be removed by ion exchange material located proximate to the supply side of the diluting compartment 32 and, consequently, migrate towards and through the associated cation exchange membrane 28 and into the water or aqueous solution of the concentrating compartment 18 proximate to the discharge side of the concentrating compartment 18. In order to cause scale formation on the concentrate compartment 18 side of anion exchange membrane 30, such scale-forming metallic cations must be successfully transported to the concentrate compartment side surface 52 of such anion exchange membrane 30. The success of such transport depends on the amount of flow distance and, hence, residence time such scale-forming metallic cations are provided within the concentrate compartment 18 and the operative transport phenomena occurring therein which causes transport of the metallic cations to the compartment side surface 52 of the anion exchange membrane 30. Because the scale-forming metallic cations tend to exist in the concentrating compartment 18 proximate to the discharge side of the concentrating compartment 18, the flow distance and residence time of such scale-forming metallic cations in the concentrating compartment 18 is relatively short, thereby reducing the risk of scale formation. Most notably, such flow distance and residence time is much shorter than for the case where the aqueous solution or water in the concentrating compartment 18 flowed in the same direction, or co-currently, as the water in the diluting compartment 32.

Figure 2:
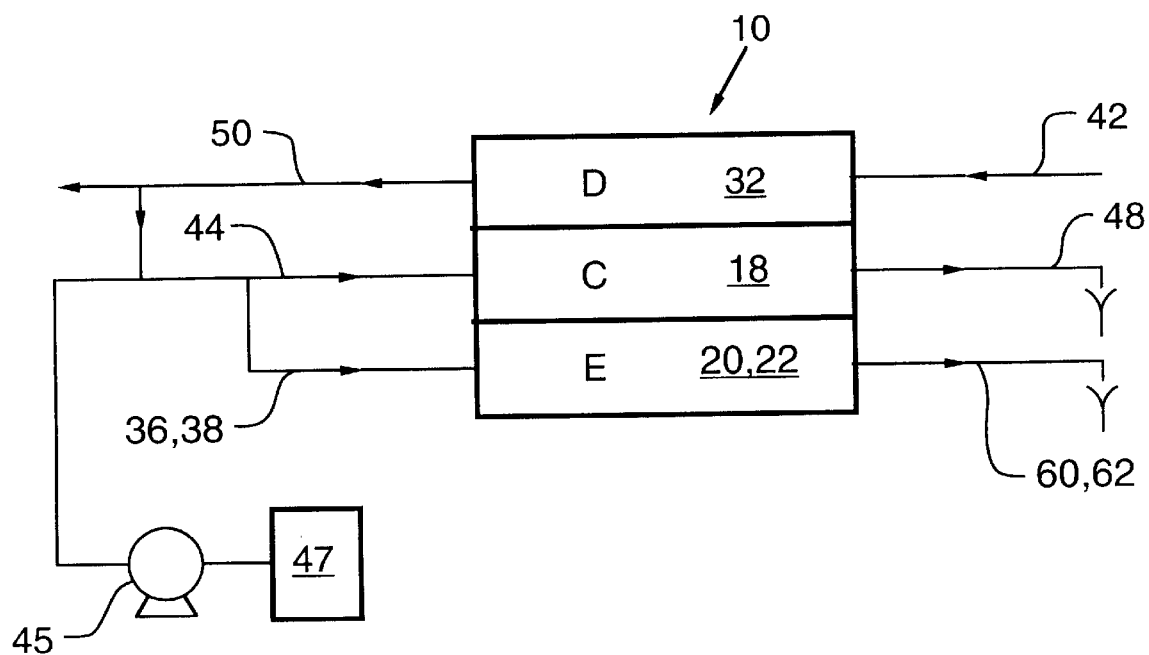
FIG. 2 is a schematic flowsheet of a second embodiment of the present invention.

In the embodiment of the present invention illustrated in FIG. 2, supply stream 44 comprises of a bleed from discharge stream 50 from the diluting compartment 32. Such supply stream 44 is relatively free of scale-forming metallic cations, and therefore does not contribute to conditions which favour scale formation on the concentrate compartment side surface 52 of the anion exchange membrane 30. Because the discharge stream 50 comprises of water purified by the electrodeionization unit 10, the dissolved salt concentration of the discharge stream 50 is substantially non-existent. Such water, left untreated, would be highly resistant to current flow through the electrodeionization unit 10. Accordingly, to mitigate this problem, it is desirable to inject saline solution into supply stream 44 to increase the conductivity of the water in the concentrating compartment 18. This can involve injecting a solution of an inert salt from storage vessel 45, such as sodium chloride or potassium chloride, into supply stream 44 by means of a metering pump 47. As an example, metred injection of 100 g/L sodium chloride solution can be employed to add 50 to 500 mg/L of sodium chloride to the concentrate compartment supply stream 44.

Figure 3:
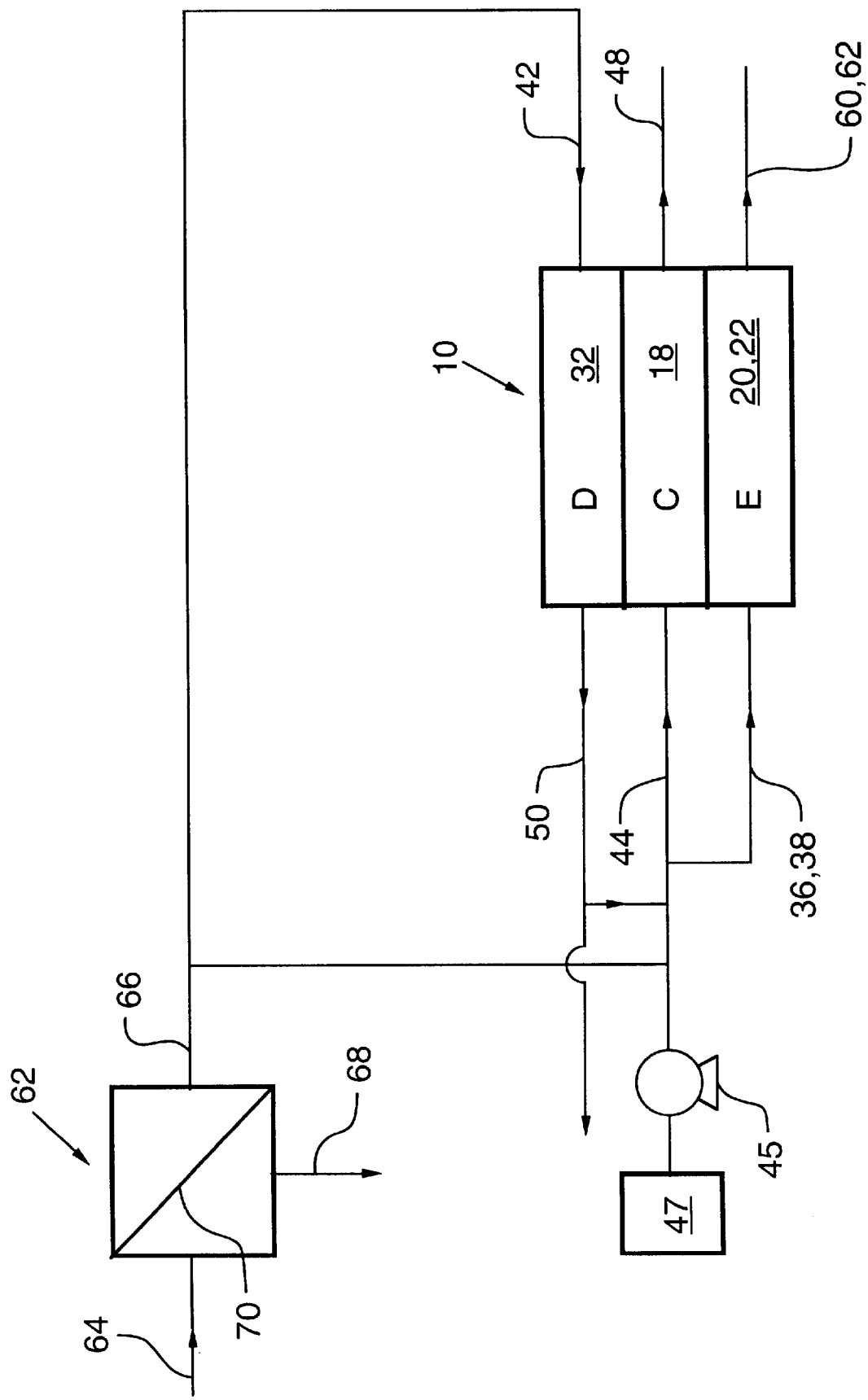
FIG. 3 is a schematic flowsheet of a third embodiment of the present invention.

In the embodiment of the present invention illustrated in FIG. 3, electrodeionization unit 10 is operated in series with reverse osmosis unit 62 for the purification of water. Water to be treated is supplied into the reverse osmosis unit 62 by supply stream 64, wherein the supplied water is separated into permeate stream 66 and retentate stream 68 by membrane 70, well known in the art. The permeate stream 66 is connected to supply stream 42 for further treatment in the electrodeionization unit 10, whereas retentate stream 68 either is discharged to drain or is used for other purposes, such as in cooling towers. A bleed is taken from the permeate stream 66 and connected to supply stream 44 for supply of aqueous liquid to concentrating compartment 18, anode compartment 20 and cathode compartment 22.

By virtue of pre-treatment in the reverse osmosis unit 62, permeate stream 66 and, therefore, supply stream 44, contain sufficiently low scale-forming metallic cation concentrations such that their contribution to scale formation in the concentrating compartment 18 may be insubstantial. Preferably, the concentration of scale-forming metallic cations in supply stream 44 is less than 5 ppm as calcium carbonate, and more preferably less than 1 ppm as calcium carbonate. However, for these same reasons, supply stream 44 may contain low salt concentrations and, as a result, may not be sufficiently conductive for use in the concentrating compartment 18 of the electrodeionization unit 10. Accordingly, to mitigate this problem, it may be desirable to inject saline solution into supply stream 44 to increase the conductivity of the water in the concentrating compartment 18, anode compartment 20, and cathode compartment 22 as in the manner with respect to the embodiment illustrated in FIG. 2.

Figure 4:
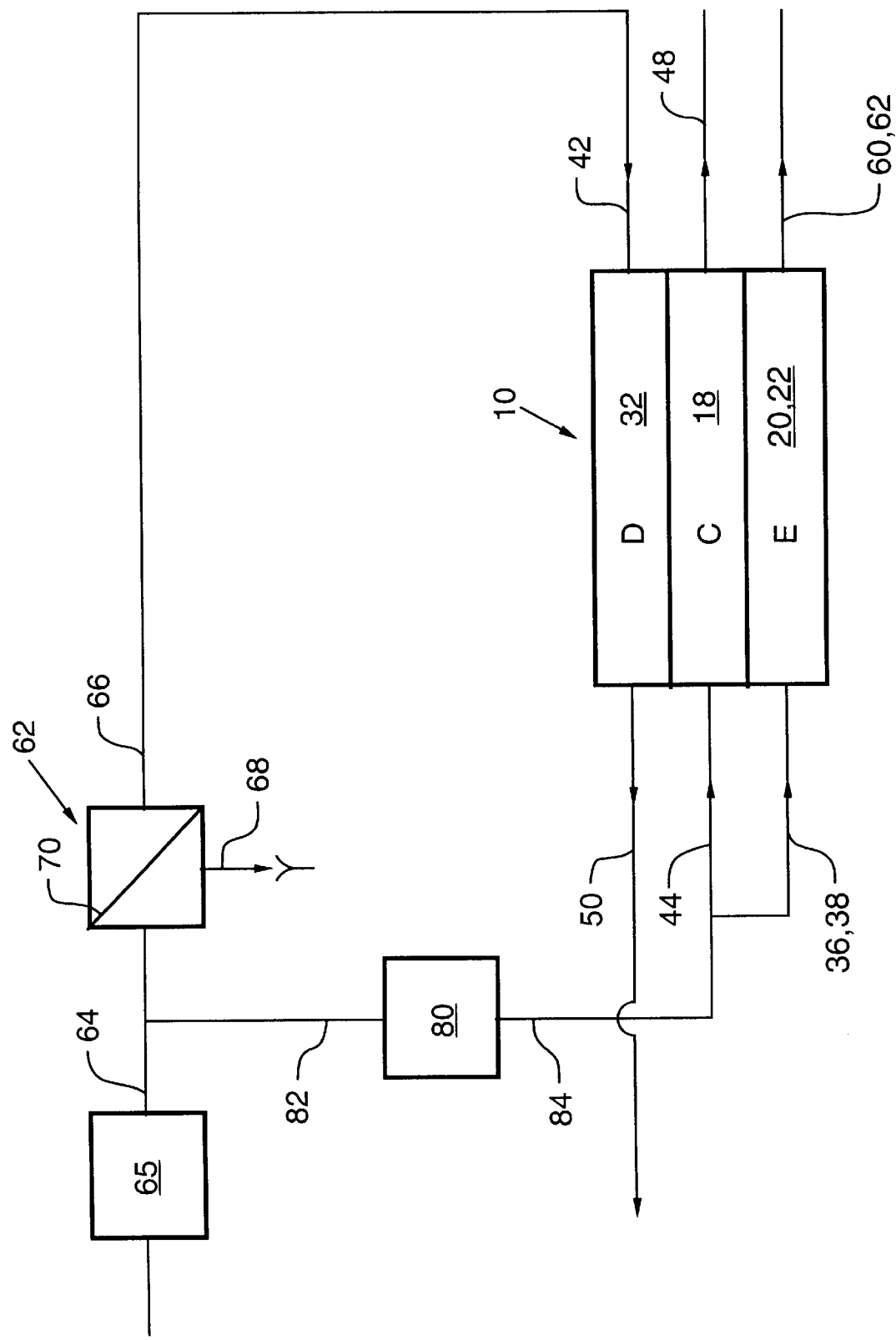
FIG. 4 is a schematic flowsheet of a fourth embodiment of the present invention.

In the embodiment illustrated in FIG. 4, instead of being treated in a reverse osmosis unit 62 as in accordance with the embodiment in FIG. 3, the supply stream 44 may comprise of water which has been bled from reverse osmosis unit supply stream 64 and then softened by softening unit 80 to remove unwanted scale-forming metallic cations. The bleed from supply stream 64 can be subjected to upstream pre-treatment by separator 65 wherein pre-treatment means include mechanical filtration, classification, or activated carbon adsorption. Water bled from supply stream 64 is supplied into softening unit 80 by supply stream 82. Softening is usually accomplished by means of ion exchange. In this respect, softening unit 80 can comprise of a sodium-cycle softener having a pressure vessel containing strong acid cation exchange resin in the sodium form. Scale-forming metallic cations in stream 82 to the softening unit 80 are taken up by the cation exchange resin with the concomitant release of sodium ions. As a result, the discharge stream 84 from the softening unit 80 is depleted in scale-forming metallic cations. When exhausted, the strong acid cation exchange resin is regenerated using sodium chloride brine. Similar ion exchange softeners may employ other regenerating chemicals, such as potassium chloride or mineral acids, or other types of ion exchange resins, such as weak acide cation exchange resin.

The discharge stream 84 from the softening unit 80 may be connected to the supply stream 44 for supply of aqueous liquid to the concentrating compartment 18, anode compartment 20, and cathode compartment 22. Dissolved salt concentrations in discharge stream 84 are sufficiently high such that additional salt injection is typically not necessary for purposes of increasing conductivity of the aqueous liquid in concentrating compartment 18, anode compartment 20, and cathode compartment 22.

Figure 6:
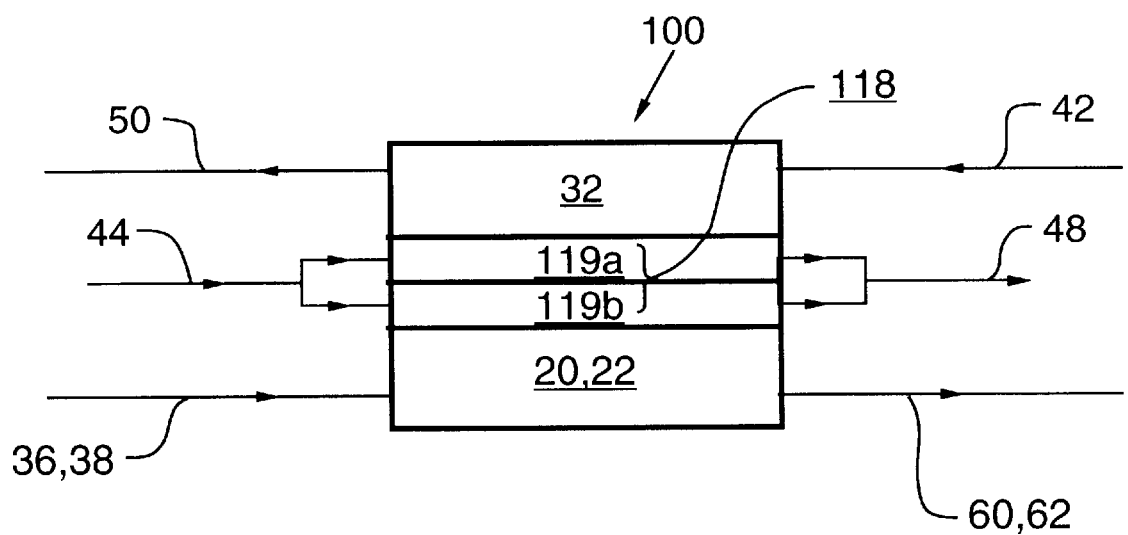
FIG. 6 is a schematic flowsheet of a fifth embodiment of the present invention.
Figure 7:
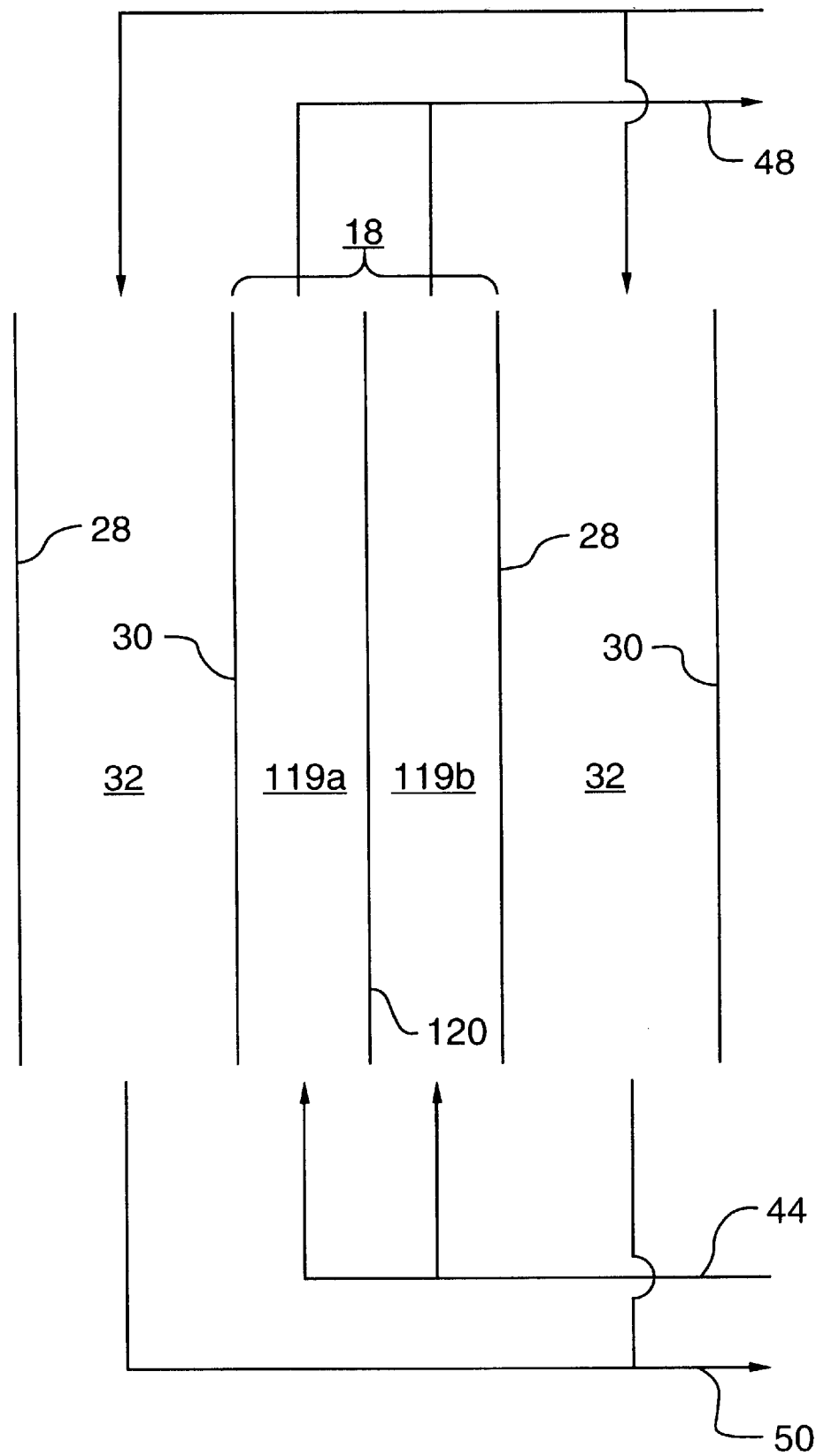
FIG. 7 is a detailed schematic drawing of a section of the electrodeionization unit of FIG. 6.

FIGS. 6 and 7 illustrate a further embodiment of the present invention wherein an electrodeionization unit 100 has concentrating compartments 118 which are divided into first and second compartments 119a and 119b by a porous diaphragm or ionconducting membrane (hereinafter "separator") 120. Porous diaphragm can be composed of mesh or perforated sheet made from polyolefin material, or can comprise of felts or non-woven sheets. A suitable commercially available porous diaphragm is MF™ Membrane No. 1147027, MF™ Membrane No. 1147028, or MF™ Membrane No. 1147029, all of which are manufactured by Osmonics of Minnetonka, Minn., U.S.A., or Celgard™ 3401 Microporous Flat Sheet Membrane, or Celgard™ 3501 Microporous Flat Sheet Membrane, both of which are manufactured by Hoechst Celanese Corporation, 13800 South Lakes Drive, Charlotte, N.C., U.S.A. Ion-conducting membranes can be either permselective or non-permselective. Non-permselective membranes include dialysis membranes, membranes with both positive and negative fixed ionic groups, examples of which comprise sulfonates, quaternary amines, and carboxylates. Suitable commercially available perm-selective membranes include SELEMION AME™ and SELEMION CME™, both manufactured by Asahi Glass Co. of Japan.

Aqueous solution or water introduced into each of first compartment 119a and second compartment 119b by supply line 44, and anion and cation species which subsequently migrate into these compartments, are collected and removed as a concentrate solution from discharge stream 48. In all other aspects, electrodeionization unit 100 is identical to electrodeionization unit 10 illustrated in FIG. 5.

First compartment 119a is defined by anion exchange membrane 30 and separator 120, and second compartment 119b is defined by cation exchange membrane 28 and separator 120. Separator 120 prevents mixing of liquids in first compartment 119a with liquid in second compartment 119b, but permits dissolved ions to migrate between the first compartment 119a and second compartment 119b under the influence of the applied electric field.

The present invention will be described in further detail with reference to the following non-limitative examples.

EXAMPLE 1

An electrodeionization device (effective area 507 cm$^2$ [width (=diluting and concentrating compartment spacer width) 13 cm, length (=diluting and concentrating compartment spacer length) 39 cm]×30 cell pairs) comprised a filter press type electrodeionization stack, having diluting compartments alternating with concentrating compartments, each of these compartments being bounded by a cation exchange membrane (strong acid type heterogeneous membrane, thickness 0.05 cm, ion exchange capacity 4.5 meq/g-dry resin) and an anion exchange membrane (strong base type heterogeneous membrane, thickness 0.05 cm, ion exchange capacity 3.5 meq/g-dry resin) arranged and fixed by way of diluting compartment spacer frames (made of polypropylene) and concentrating compartment frames (made of polyolefin). The thickness of the demineralizing compartments was 0.8 cm. The open areas of the concentrating compartments consisted of a sequential layered arrangement of two layers of 0.56 mm thick polypropylene fused mesh, one (middle) layer of 0.18 mm thick porous membrane (MF membrane #1147027 from Osmonics, Minnetonka, Minn., U.S.A.) and two layers of 0.56 mm thick polypropylene fused mesh. The middle layer functioned as a separator membrane and serve to limit the convective mixing in the concentrating compartments.

The diluting compartments were packed with cation exchange resin and anion exchange resin, each resin in the form of a sheet-like product consisting of a mixture of ion exchange resin and a binder in a dry state. The above two ion exchange resins were of a sulfonic acid type cation exchange resin (Diaion SK-1B™ manufactured by Mitsubishi Chemical Corporation) and a quaternary ammonium salt anion exchange resin Diaion SA-10A™ manufactured by Mitsubishi Chemical Corporation) and were used in an anion to cation volumetric ration (dry) of 54:46.

By using this electrodeionization device, a test was carried out in the following manner. Feed water to be purified was prepared comprising of 1 ppm hardness as $CaCO_3$ (0.67 ppm Ca, 0.33 ppm Mg), 0.5 ppm reactive silica as $SiO_2$, and 13.5 ppm sodium chloride. The feed water to be purified was passed in a downward direction through the diluting compartments of the electrodeionization device at a flow rate of 12.5 US gpm. Low hardness water, whose conductivity was increased to 800–1,800 microSiemens/cm by the injection of a low hardness solution of sodium chloride, was passed in an upward direction (countercurrent flow) through the concentrating and electrode compartments at a flow rate of 1.0–1.1 US gpm and discharged to drain. The concentrate and electrode feed stream was introduced at a pressure of 5–10 psig below that of the outlet stream from the diluting compartments. The D.C. electric current through the electrodeionization device was set at 4.3 Amps using a rectifier capable of a maximum output voltage of 600 Volts. During operation, the stack voltage and product water resistivity were monitored for indications of deleterious scaling (increase in voltage, decrease in product water resistivity). At the start of the experiment, the maximum applied voltage of 600 Volts produced a current of 3.2 Amps, but this current increased to the set point of 4.3 Amps while the voltage dropped to 470 Volts and remained at this level for the duration of the experiment (386 hours operation). The product water maintained a resistivity value over 17.3 MOhm.cm for the duration of the experiment. The constant voltage and consistently high product water resistivity indicate the absence of significant scaling.

EXAMPLE 2

A comparative experiment was conducted in the manner as in Example 1 described above, with the following exceptions:

a) the open areas of the concentrating compartments consisted of a sequential layered arrangement of one layer of 0.56 mm thick polypropylene fused mesh, one (middle) layer of 1.0 mm thick polypropylene fused mesh, and one layer of 0.56 mm thick polypropylene fused mesh. The open nature of the middle mesh layer allowed for convective mixing in the concentrating compartments, b) the feed to the diluting compartments was directed upward in a co-flow direction with respect to the concentrate and electrode streams, and c) the concentrate stream was partially recirculated to the electrodeionization device, with make-up water to the concentrate loop consisting of feed water to be treated (including hardness).

The target operating current of 4.3 Amps was passed with the available 600 Volts D.C. (concentrate feed conductivity of 800 microSiemens/cm) for the first few hours, and the current then decreased steadily to 2 Amps (maximum D.C. voltage of 600 Volts) over the duration of the experiment (300 hours). The product water resistivity had an initial value of 17.5 MOhm.cm, but decreased to 16 MOhm.cm after 220 hours of operation, and further decreased to less than 2 MOhm.cm after 300 hours of operation. These decreases in current (at constant voltage of 600 Volts D.C.) and product resistivity are typical of the formation of scale on the concentrate chamber side of the anion membranes.

As indicated in the above Example 1 and Example 2, operation of an electrodeionization device as described in accordance with the process and apparatus of the present invention (counter-current flow, separator membrane in concentrate chamber, low hardness feed water to the concentrate chambers, and no recirculation of concentrate outlet) enabled an electrodeionization device to operate in the presence of hardness in the water to be treated without accumulation of scale.

The present invention provides a number important advantages. By effecting countercurrent flow in the diluting and concentrating compartments, scale-forming metallic cations which migrate into the concentrating compartments are provided with and a shorter flow length and, hence, less residence time in the concentrating compartments. This is particularly due to the fact that the majority of scale-forming metallic cations in the feed water to the diluting compartments are removed proximate the inlet end of the diluting compartment and subsequently migrate through the cation exchange membrane and enter the concentrating compartment proximate the discharge end of the concentrating compartment. By doing so, the amount of flow length and, hence, time available for transport of scale-forming metallic cations to the surface of the anion exchange membrane is reduced, thereby mitigating scale formation at such surface. As a further means of impeding transport of metallic cations to the concentrate compartment side surface of the anion exchange membranes, the concentrate compartment may be divided into first and second compartments by a porous diaphragm or ion-conducting membrane such that the liquid proximate to the anion exchange membrane is prevented from mixing with the liquid proximate the cation exchange membrane but migration of ions through the abovementioned diaphragm or membrane is permitted. In this respect, the diaphragm or membrane effectively reduces the rate of transport of scale-forming metallic cations from the compartment proximate the cation exchange membrane to the compartment proximate the anion exchange membrane by substantially eliminating the convective element of such transport.

It will be understood, of course, that modifications can be made in the embodiments of the invention described herein without departing from the scope and purview of the invention as defined by the appended claims.

We claim:

1. A method for inhibiting formation of scale in an electrodeionization unit for deionizing water having an anode compartment at one end of the unit, a cathode compartment at the opposite end of the unit, and a plurality of diluting compartments alternating with concentrating compartments positioned between the said anode and cathode compartments, comprising the steps of:
   passing feed water to be deionized through the diluting compartments to produce a purified water stream;
   removing scale-forming metallic cations from water or aqueous solution for accepting ions from the feed water;
   passing said water or an aqueous solution for accepting ions from the feed water through at least one of said concentrating compartments in a direction opposite to that of said feed water;
   passing water or an aqueous solution through the anode and cathode compartments;
   applying an electrical voltage between the said anode and the said cathode whereby ions in the feed water migrate to the water or aqueous solution in the concentrating compartments.

2. The method as claimed in claim 1 wherein said water or aqueous solution for accepting ions from the feed water is passed through each of said concentrating compartments in a direction opposite to that of said feed water.

3. The method as claimed in claim 2 wherein said water or aqueous solution for accepting ions from the feed water is not recycled.

4. The method as claimed in claim 2 wherein said water or aqueous solution for accepting ions from the feed water is supplied by a bleed from said purified water stream.

5. The method as claimed in claim 4 comprising the additional step of injecting saline solution to said water or aqueous solution for accepting ions from the feed water prior to passing through said concentrating compartment.

6. The method as claimed in claim 2 wherein said water or aqueous solution for accepting ions from the feed water has a concentration of scale-forming metallic ions of less than 5 ppm as calcium carbonate prior to introduction to said concentrating compartment.

7. The method as claim 6 wherein said concentration of scale-forming metallic cations is less than 1 ppm as calcium carbonate.

8. The method as claimed in claim 7 wherein said scale-forming metallic cations are selected from the group consisting of: $Ca^{2+}$, $Mg^{2+}$, $Sr^{2+}$, $Ba^{2+}$, $Fe^{3+}$, and $Al^{3+}$.

9. The method as claimed in claim 1 wherein said scale-forming metallic cations are removed by a water softening process.

10. The method as claimed in claim 1 wherein said water or aqueous solution for accepting ions from the feed water is supplied by a bleed from a permeate stream of a reverse osmosis unit.

11. The method as claimed in claim 10 comprising the additional step of injecting saline solution to said water or aqueous solution for accepting ions from the feed water prior to passing through said concentrating compartment.

12. An electrodeionization unit for deionizing water having an anode compartment at one end of the unit, a cathode compartment at the opposite end of the unit, and a plurality of diluting compartments alternating with concentrating compartments between the said anode and cathode compartments, each of said diluting and concentrating compartments defined by anion and cation exchange membranes, at least one of said concentrating compartments further comprising a porous diaphragm or ion-conducting membrane for dividing said concentrating compartment into first and second compartments such that said first compartment is defined by an anion exchange membrane and said porous diaphragm or ion-conducting membrane and said second compartment is defined by said cation exchange membrane and said porous diaphragm or ion-conducting membrane wherein liquid in said first compartment is prevented from mixing with liquid in said second compartment and wherein ions can migrate between said first and second compartments through said porous diaphragm or ion-conducting membrane.

13. A method for inhibiting formation of scale in an electrodeionization unit for deionizing water having an anode compartment at one end of the unit, a cathode compartment at the opposite end of the unit, and a plurality of diluting compartments alternating with concentrating compartments between the said anode and cathode compartments, each of said diluting and concentrating compartments defined by anion and cation exchange membranes, at least one of said concentrating compartments further comprising a porous diaphragm or ion-conducting membrane for dividing said concentrating compartment into first and second compartments such that said first compartment is defined by an anion exchange membrane and said porous diaphragm or ion-conducting membrane and said second compartment is defined by said cation exchange membrane and said porous diaphragm or ion-conducting membrane wherein liquid in said first compartment is prevented from mixing with liquid in said second compartment and wherein ions can migrate between said first and second compartments through said porous diaphragm or ion-conducting membrane, comprising the steps of:

passing feed water to be deionized through the diluting compartments to produce a purified water stream;

passing water or an aqueous solution for accepting ions from the feed water through the first and second concentrating compartments;

passing water or an aqueous solutions through the anode and cathode compartments;

applying an electrical voltage between the said anode and the said cathode whereby ions in the feed water migrate to the water or aqueous solution in the first and second concentrating compartments.

14. The method as claimed in claim 13 wherein said water or aqueous solution for accepting ions from the feed water is passed through at least one of said second concentrating compartment of said concentrating compartments in a direction opposite to that of said feed water.

15. The method as claimed in claim 14 wherein said water or aqueous solution for accepting ions from the feed water is passed through each of said second concentrating compartment of said concentrating compartments in a direction opposite to that of said feed water.

16. The method as claimed in claim 15 wherein said water or aqueous solution for accepting ions from the feed water is not recycled.

17. The method as claimed in claim 15 comprising the additional step of removing scale-forming metallic cations from said water or aqueous solution for accepting ions from the feed water prior to passing said water or aqueous solution through said concentrating compartment.

18. The method as claimed in claim 17 wherein said scale-forming metallic cations are removed by a water softening process.

19. The method as claimed in claim 17 wherein said water or aqueous solution for accepting ions from the feed water is supplied by a bleed from a permeate stream of a reverse osmosis unit.

20. The method as claimed in claim 19 comprising the additional step of injecting saline solution to said water or aqueous solution for accepting ions from the feed water prior to passing through said concentrating compartment.

21. The method as claimed in claim 15 wherein said water or aqueous solution for accepting ions from the feed water is supplied by a bleed from said purified water stream.

22. The method as claimed in claim 21 comprising the additional step of injecting saline solution to said water or aqueous solution for accepting ions from the feed water prior to passing through said concentrating compartment.

23. The method as claimed in claim 15 wherein said water or aqueous solution for accepting ions from the feed water has a concentration of scale-forming metallic ions of less than 5 ppm as calcium carbonate prior to introduction to said concentrating compartment.

24. The method as claim 23 wherein said concentration of scale-forming metallic cations is less than 1 ppm.

25. The method as claimed in claim 24 wherein said scale-forming metallic cations are selected from the group consisting of: $Ca^{2+}$, $Mg^{2+}$, $Sr^{2+}$, $Ba^{2+}$, $Fe^{3+}$, and $Al^{3+}$.

26. A method for inhibiting formation of scale in an electrodeionization unit for deionizing water having an anode compartment at one end of the unit, a cathode compartment at the opposite end of the unit, and a plurality of diluting compartments alternating with concentrating compartments positioned between the said anode and cathode compartments, comprising the steps of:

passing feed water to be deionized through the diluting compartments to produce a purified water stream;

removing scale-forming metallic cations from water or aqueous solution for accepting ions from the feed water;

injecting saline solution to said water or aqueous solution for accepting ions from the feed water;

passing said water or an aqueous solution for accepting ions from the feed water through at least one of said concentrating compartments;

passing water or an aqueous solution through the anode and cathode compartments; and applying an electrical voltage between the said anode and the said cathode whereby ions in the feed water migrate to the water or aqueous solution in the concentrating compartments.

27. The method as claimed in claim 26 wherein said water or aqueous solution for accepting ions from the feed water is supplied by a bleed from said purified water stream.

28. The method as claimed in claim 26 wherein said water or aqueous solution for accepting ions from the feed water is supplied by a bleed from a permeate stream of a reverse osmosis unit.

* * * * *